US012612991B2

(12) United States Patent　　(10) Patent No.: US 12,612,991 B2

Gehlot　　(45) Date of Patent: Apr. 28, 2026

(54) PASSIVE SURGE WATER HAMMER PROTECTION SYSTEM

(71) Applicant: Ashok Gehlot, Jodhpur (IN)

(72) Inventor: Ashok Gehlot, Jodhpur (IN)

( * ) Notice: Subject to any disclaimer, the term of this patent is extended or adjusted under 35 U.S.C. 154(b) by 502 days.

(21) Appl. No.: 18/026,156

(22) PCT Filed: Sep. 9, 2021

(86) PCT No.: PCT/IN2021/050881

§ 371 (c)(1),
(2) Date: Mar. 14, 2023

(87) PCT Pub. No.: WO2022/059020

PCT Pub. Date: Mar. 24, 2022

(65) Prior Publication Data

US 2023/0366500 A1　　Nov. 16, 2023

(30) Foreign Application Priority Data

Sep. 16, 2020　(IN) .............................. 202021040070

(51) Int. Cl.
*F16L 55/045* (2006.01)
*F16L 51/04* (2006.01)

(52) U.S. Cl.
CPC .................................. *F16L 55/045* (2013.01)

(58) Field of Classification Search
CPC ...... F16L 51/04; F16L 55/045; F04B 11/0091
USPC .................................................... 138/42, 26
See application file for complete search history.

(56) References Cited

U.S. PATENT DOCUMENTS

| | | | | | |
|---|---|---|---|---|---|
| 2,068,876 | A | * | 1/1937 | Snyder, Jr. .............. | F16L 51/04 403/220 |
| 5,259,700 | A | * | 11/1993 | Langner ................. | F16L 51/04 166/346 |
| 5,803,506 | A | * | 9/1998 | Argersinger ............ | F16L 51/04 285/226 |
| 2022/0364668 | A1 | * | 11/2022 | Soliman ................ | F16L 55/055 |

FOREIGN PATENT DOCUMENTS

| | | |
|---|---|---|
| CN | 106195360 A | 12/2016 |
| CN | 110440089 A | 11/2019 |

OTHER PUBLICATIONS

International Search Report, Indian Patent Office, Nov. 24, 2021.
Written Opinion International Search Authority, Indian Patent Office, Nov. 24, 2021.

* cited by examiner

*Primary Examiner* — Kenneth Rinehart
*Assistant Examiner* — Haotian Lu
(74) *Attorney, Agent, or Firm* — Bay State IP, LLC

(57) ABSTRACT

A novel passive surge water hammer protection system, which is useful for Automated Surge Water-Hammer Transients control, protection and for preventing water hammer transients from occurring in a water pipeline & pumping plant. The present SCT invention creates two differential HGLs at same junction/node, Upstream level at (16) and Downstream level at (10) inside the circular vertical loop (4)=(1,16,9,10,11,2) an unequal column separation, vertical differential (16,10) is developed, this simple passive method to force the minimum negative pressure from below the pipe invert level to minimum positive pressure (16,10) which is well above the pipe invert level (HGL-3).

3 Claims, 3 Drawing Sheets

ELEVATION (in m)

LENGTH (in m)

TYPICAL SURGES in RISING MAINS without SURGE PROTECTION EQUIPMENT

ELEVATION (in m)

LENGTH (in m)

TYPICAL SURGES in RISING MAINS with SCT based Surge Control Tower (SCT) as PASSIVE SURGE PROTECTION EQUIPMENT

FIGURE- 3.1                    PLAN

FIGURE- 3.2                    ELEVATION

15=Downsurge

14=Upsurge

UPSTREAM SIDE

DOWNSTREAM SIDE

PASSIVE SURGE WATER HAMMER PROTECTION SYSTEM

CROSS REFERENCE TO RELATED APPLICATION

This application is for entry into the U.S. National Phase from which priority is claimed under all applicable sections of Title 35 of the United States Code including, but not limited to, Sections 120, 363, and 365 (c) to International Application No. PCT/IN2021/050881 filed on Sep. 9, 2021, and which in turn claims priority under 35 USC 119 to Indian patent application Ser. No. 202021040070 filed on Sep. 16, 2020.

FIELD OF THE INVENTION

The present invention relates to A NOVEL PASSIVE SURGE WATER HAMMER PROTECTION SYSTEM which is useful for Automated Surge Water-Hammer Transients control and protection, in Long Pumping Mains as well as Gravity Mains. The present invention of Surge Control Tower (SCT), relates to Water Hammer Preventing Structure for preventing water hammer transients from occurring in a water pipeline system.

BACKGROUND OF THE INVENTION

In any Newtonian fluid (including water) supply pipeline, which conveys fluid/water is pumped by Pumping Plant (further referred as Pump for simplicity) or the like, when the Pump is stopped, or when the rotation speed of pump is suddenly changed due to sudden power failure/power restoration, or when any downstream discharge valve is suddenly opened/closed, Check valve failure, failed sluice gate suddenly drops, or the water in the water supply line is used/withdrawn rapidly then, the flow velocity changes rapidly, and a large pressure (water hammer pressure) may be generated in the pipeline. This phenomenon is known as a Water Hammer Phenomenon and depending on the degree thereof, may cause damage to a pipeline or a water pumping plant, or may cause vibration or noise.

In particular, when the discharge amount of the water supply pump suddenly decreases due to a sudden stoppage of the water supply pump or the like, the pressure in the downstream portion of the water supply pump, rapidly drops due to the inertia of water in the pipeline, and a negative pressure is generated. When the negative pressure falls below the saturated vapor pressure of water, water vapor bubbles/steam is generated and a cavity is formed. As these bubbles expand and create splitting of fluid into two separate fluid segments. This phenomenon is called Water Column Separation. As the water column separation occurs and later, when the pressure in the pipeline returns to the normal pressure, the water vapor bubbles/steam (formed due to water column separation) condense and the hollow part is crushed/impounded, and an impact pressure-wave is generated, destruction may be caused to the pump & pipeline system.

In order to prevent such a water hammer phenomenon, various devices have been proposed and put into practical use. This type of devices, include a flywheel, an air chamber, and the like. Of these, the flywheel is a flywheel connected to the rotating part of the pump, which increases the inertial force when the water supply pump is stopped to mitigate the change in the rotation speed and prevents the pipe pressure from dropping sharply. The air chamber is disposed at a point where a negative pressure is generated in the pipe, and prevents water from suddenly lowering by pushing water into the pipe when the pressure in the pipe decreases.

Drawbacks

There are Several Surge Control Devices and Equipment available, they can be broadly grouped into two major categories, namely, "Passive Surge Control Devices" & "Active Surge Control Devices".

1. Passive Surge Control Devices like One-way Surge tank, Two-way Surge tank, standpipe etc. which are Surge protection Devices/structures. All these passive surge control devices are to be erected above the maximum upsurge NGL level to avoid overflows during sudden pump failure transients.

Drawbacks of Passive Surge Control Devices:—Despite being effective passive surge protection devices, have an inherent drawback that they are limited to favourable terrain topography along pipe alignment avoiding very tall One-way like Surge Protection Structures and if terrain does not permit, then usually have to adopt active surge devices.

2. Active Surge Control Devices like Air Vessel, Hydrophonic Tanks, Bladder Pressure vessels, Special Early anticipatory Surge devices and Valve system, anti-slam surge valves etc. are used in Surge Protection System and they being Active devices, have to control surge water hammer waves before it gains damaging severity, the response times are within fraction of a second, and there is, no scope for, equipment response failure of Active Surge Control Devices, it has to be maintained in war-ready mode, without fail, in order to Prevent Surge Water Hammer failures of Pipeline & Pumping Plant.

Drawback of Active Surge Control Devices:—Any failure/delayed operation of active surge control devices listed above may result in destruction to the pump & pipeline system. Active Surge Control Devices/valves which though are effective, have to be maintained in active and operating condition 24×7, are prone to wear & tear, costly maintenance, and any unforeseen lapses, will be disastrous for the pipeline,

Solutions Available in Prior Art

The Passive Surge Protection devices like One-way Surge tank, Two-way Surge tank, standpipe etc. and Active Surge Protection like Air Vessel, Hydro-phonic Tanks, Bladder Pressure vessels, Special Early anticipatory Surge devices and Valve system, anti-slam surgevalves etc. are already used in Surge Protection System.

Apart from the Prior art mentioned above, my earlier invention, a new innovative technique of HGL regulation via Gravity Control Towers (GCT) can be developed further to be an effective solution to this chronic Surge Control problem of Water works.

The high Up-Surge will burst the pipeline and sub-atmospheric vacuum Down-Surges will collapse & crush large diameter pipeline specially MS pipeline in fraction of seconds if Pump/Power Failure or sudden valve closure generated surge transients, are left unattended due to any surge protection equipment failures.

Drawback of Gravity Control Towers (GCT):—GCT, despite being effective passive HGL regulation device also have its inherent drawback (like other Passive Surge Protection devices One-way Surge tank, Two-way Surge tank, standpipe etc.), that they are limited to favourable terrain topography along pipe alignment. So, very tall GCT based Surge Protection Structures subjected to extremely high thrust forces due to transients at top of GCT, and this, can render GCT non-viable Surge Protection System.

The present invention of Surge Control Tower (SCT) is specific SOLUTION of overcoming main drawback of all the existing passive surge control devices (including prior art Gravity Control Tower), "to be erected above the maximum upsurge HGL level to avoid overflows, the inherent drawback that they are limited to availability of favourable terrain topography along pipe alignment, very tall One-way like Surge Protection Structures are usually always avoided".

Object of Invention

The main object of the present invention is, further improvement of prior invention of Gravity Control Towers (GCT) and eliminating the limitations as already elaborated above. The resultant is A NOVEL PASSIVE SURGE WATER HAMMER PROTECTION SYSTEM, which is useful for Automated Surge Water-Hammer Transients control and protection in Long Pumping Mains as well as Gravity Mains. The present invention of Surge Control Tower relates to Passive Water Hammer Preventing Structure for preventing water hammer transients from occurring in a water pipeline & pumping plant.

Surge Control Device (SCT) is capable of controlling Surges without using presently available expensive & complex active surge control devices like air vessels, special surge control valves and also overcoming the suitable terrain/Height limitations of existing passive surge control devices like one way surge tank, two-way surge tank, standpipe etc.

The present SCT invention performs the additional vital role of intermediate support towers/piers keeping Downsurge HGL within permissible design limits thereby preventing sub-atmospheric vacuum failures in pipeline (especially MS Pipes).

Advantages of Surge Control Tower (SCT)

The advantages of present invention relate to SCT based Water Hammer Preventing Structure using a series of smaller surge control towers system as Passive Surge Control Device without any/very low maintenance and the invention requires no power supply meaning totally power-free.

Further the invention requires Zero manpower to operate and minimal man power during scheduled/annual routine maintenance of air valve/vacuum breaker checkups only, thus SCT is a totally un-manned Protection system.

The SCT invention itself is failsafe technology. Once properly designed, scenario simulated & optimized, the SCT system after erection, need no further human intervention, the SCT will passively control all types of Surge extremes without failure as there are no moving parts (except maintenance free ss floats in air valves (which already carry a 10 years' warranty)), so no wear & tear, no electric/electronics/advanced instrumentation, thus no electric power requirements, Therefore, present SCT invention can be termed as a Fit & Forget technology.

STATEMENT OF INVENTION

Accordingly, the invention of this present NOVEL Surge Control Tower (SCT) PASSIVE SURGE WATER HAM- MER PROTECTION SYSTEM, is an apparatus consisting of series of short (usually 6 m to 12 m heights) SCTs, well below the operating HGL to create stepped segmentation in such a way that it totally arrests the upsurge as well as Downsurges whenever occurrence of Water Hammer in the Pump-Pipeline system is encountered.

SCT provides minimum resistance to operating forward flows by adopting a large radii circular vertical loop (Head-loss in fittings is equivalent to four 90 degrees long bends) and the verticality acts as speed breakers for reverse flow surge-waves.

The entire SCT based Passive Surge Water Hammer Protection System is designed and tested on the commercially available professional Surge Analysis & simulation computer applications "SAP2R" and "Bentley-Hammer" software and all possible scenario simulations are carried out to optimize the SCT location/height/type of air valves (single/double/vacuum breaker/combination/venting/bypass pipe dia. etc.)/the inflow and outflow orifice apertures etc. and a failsafe robust SCT based Passive Surge Water Hammer Protection System is finalized.

Once the parameters are fixed and SCTs erected accordingly, the SCT based Passive Surge Water Hammer Protection System requires NO ADDITIONAL equipment no Passive Surge Protection devices/no Active Surge Protection devices/power supply/manpower/recurring expenses/SCADA/dedicated O&M infrastructure.

There are at least five variations of GCTs already covered in the Prior art, the sixth version of GCT design as Surge Control Tower (SCT) has been developed specifically for the purpose of arresting Surge Water Hammer in Pipeline passively, and with shorter tower heights, it's a fit & forget technology.

BRIEF DESCRIPTION OF FIGURES

The structure and the technical means adopted by the present invention to achieve the above and other objects can be best understood by referring to the following detailed description of the preferred embodiments and the accompanying drawings.

DETAILED DESCRIPTION OF INVENTION (WITH REFERENCE TO DRAWINGS/FIGURES)

Before explaining the present invention in detail, it is to be understood that the invention is not limited in its application to the details of the construction and arrangement of parts illustrated in the accompanying drawings. The invention is capable of other embodiments, as depicted in different figures as described above and of being practiced or carried out in a variety of ways. It is to be understood that the phraseology and terminology employed herein is for the purpose of description and not of limitation.

Figure 1:
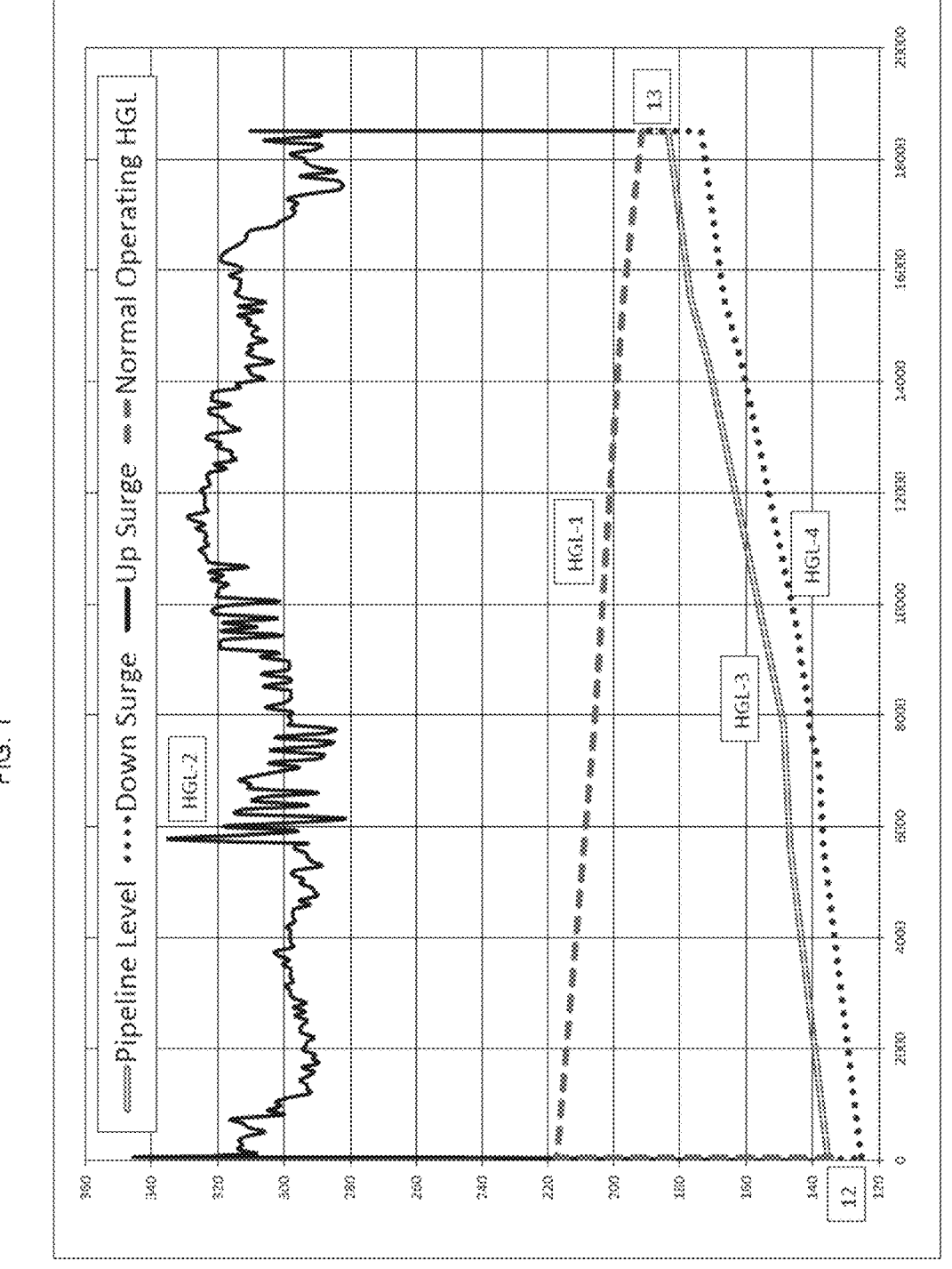
FIG. 1 explains the Surge Water hammer phenomenon graphically without any Surge Protection System.

As shown in FIG. 1, a typical case of Rising Main was analysed for Surge Waterhammer transientents. Entire pipeline is affected by sub-atmospheric vacuum Downsurges of −10.4 mwc (metre water column) below pipeline, Pipeline failure under vacuum is guaranteed if no surge protection used or traditional surge protection Equipment (like Air Vessel, Surge Tank, Air cushion valves, surge anticipation valves, zero velocity valves etc. requiring regular maintenance) fails or malfunctions.

In the FIG. 2 the SCT implementation for Surge protection is done by physically raising the down surge from −10.4 mwc below the pipeline to about 12 m above the pipeline thereby controlling the occurrence of down surge, air vacuum breaker valves atop SCTs dampen the surges further, thus the surges are fully controlled without any additional surge control devices. The maximum up-surges, maximum down-surges for SCT Surge Protected pumping mains with timeline snapshots from 0 seconds to 600 seconds (ten minutes) are enclosed for evaluation comparison.

Figure 3:
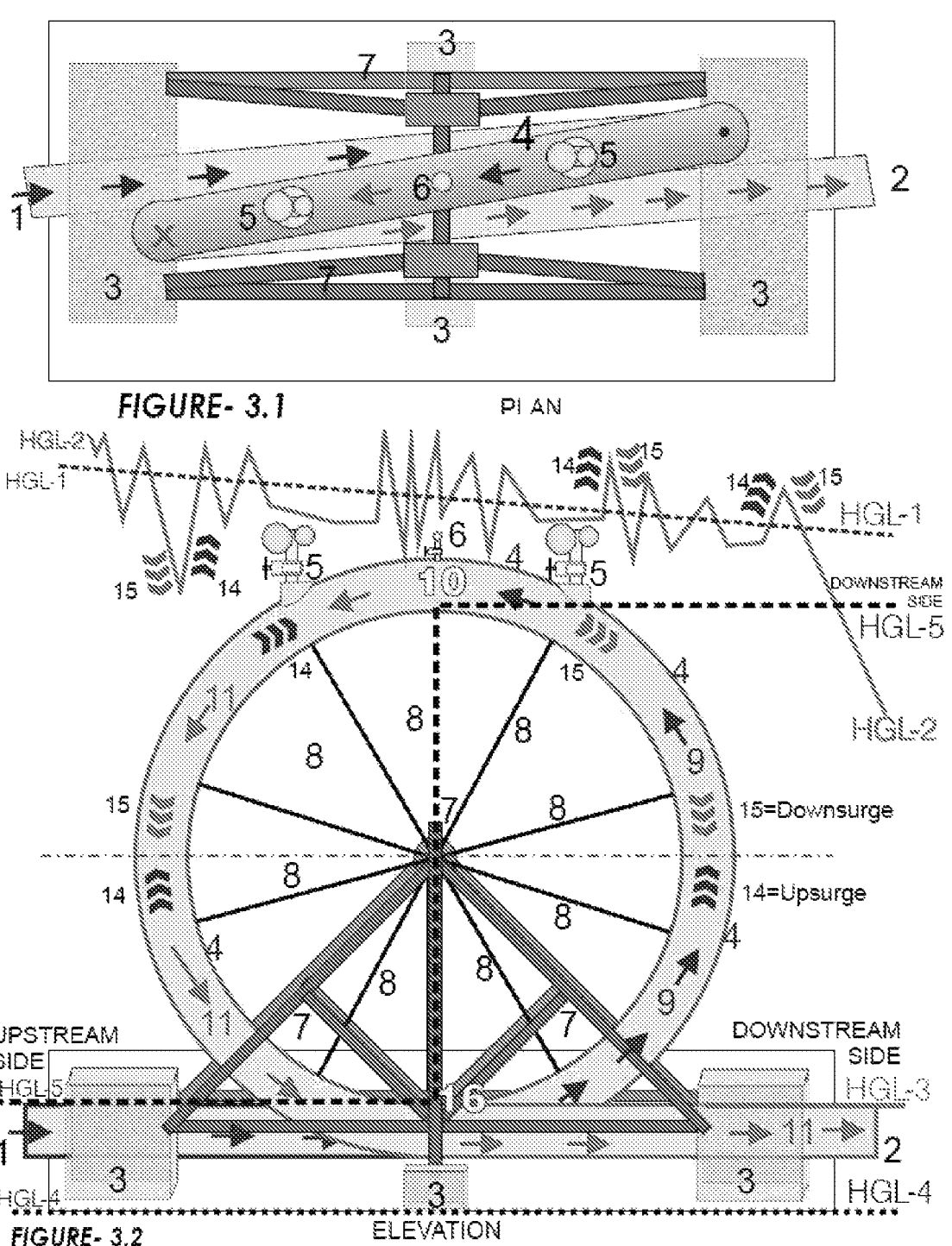
FIG. 3 explains one typical Surge Control Tower structural arrangement to function as Passive Surge Water Hammer Protection System.

In the FIG. 3 One typical Surge Control Tower (SCT) structure is depicted Surge protection is done by physically raising the down surge, The vertical circular loop arrangement has been depicted here to handle larger surge thrust forces at top of structure, but where thrusts due to surges are low, simpler SCT type arrangement can also be used.

While, the invention has been described with respect to the given embodiment, will be appreciated that many variations, modifications and other applications of the invention may be made. However, it is to be expressly understood that such modifications and adaptations are within the scope of the present invention.

Passive Surge Protection by Surge Control Tower (SCT)

To understand the Surge Water Hammer Phenomenon, please refer to FIG. 1. (Typical Surges in Rising Mains WITHOUT Surge Protection Equipment). This is a typical layout of rising main, (12) depicts the source Pumping Plant from where this rising main (depicted as HGL-3 is pipe's invert level), this rising main terminates into tail-end reservoir inlet CWR/OHSR, depicted by (13).

The normal operating Hydraulic Gradient Line (HGL-1) path is depicted as (12, HGL-1, 13), here (12) depicts the source Pumping Plant from where this rising main (depicted as HGL-3 is pipe's invert level), this rising main terminates into tail-end inlet CWR/OHSR) depicted by (13) as inlet.

The HGL is highest at start due to pumping plant (12). This (HGL-1) continues as long as surge causing events such as sudden power failure, sudden pump stops, closure of valves rapidly etc. do not occur.

But if any of these surge causing events occur, it triggers a severe Surge Water Hammer pressure wave series (at about 1.5 km/sec speed) and in fraction of seconds, these extremely high surge pressure waves can damage the pumping plant, burst pipeline, collapse pipeline and several other types of failures. (HGL-2) depicts highest pressure surge called Upsurge wave which is responsible for pipe bursts and other appurtances failures.

Whenever sufficient air enters the pipeline and water surfaces get separated into two segments, Water Column Separation occurs, and pipeline gets subjected to sub-atmospheric vacuum pressures normally called Downsurge depicted as (HGL-4), This Downsurge causes pipeline collapse inwards especially in MS pipeline. The pipeline has thus, to bear the Upsurges and Downsurges frequently and surge failures are inevitable if no Surge Protection Equipment are provided in the pipeline system.

Figure 2:
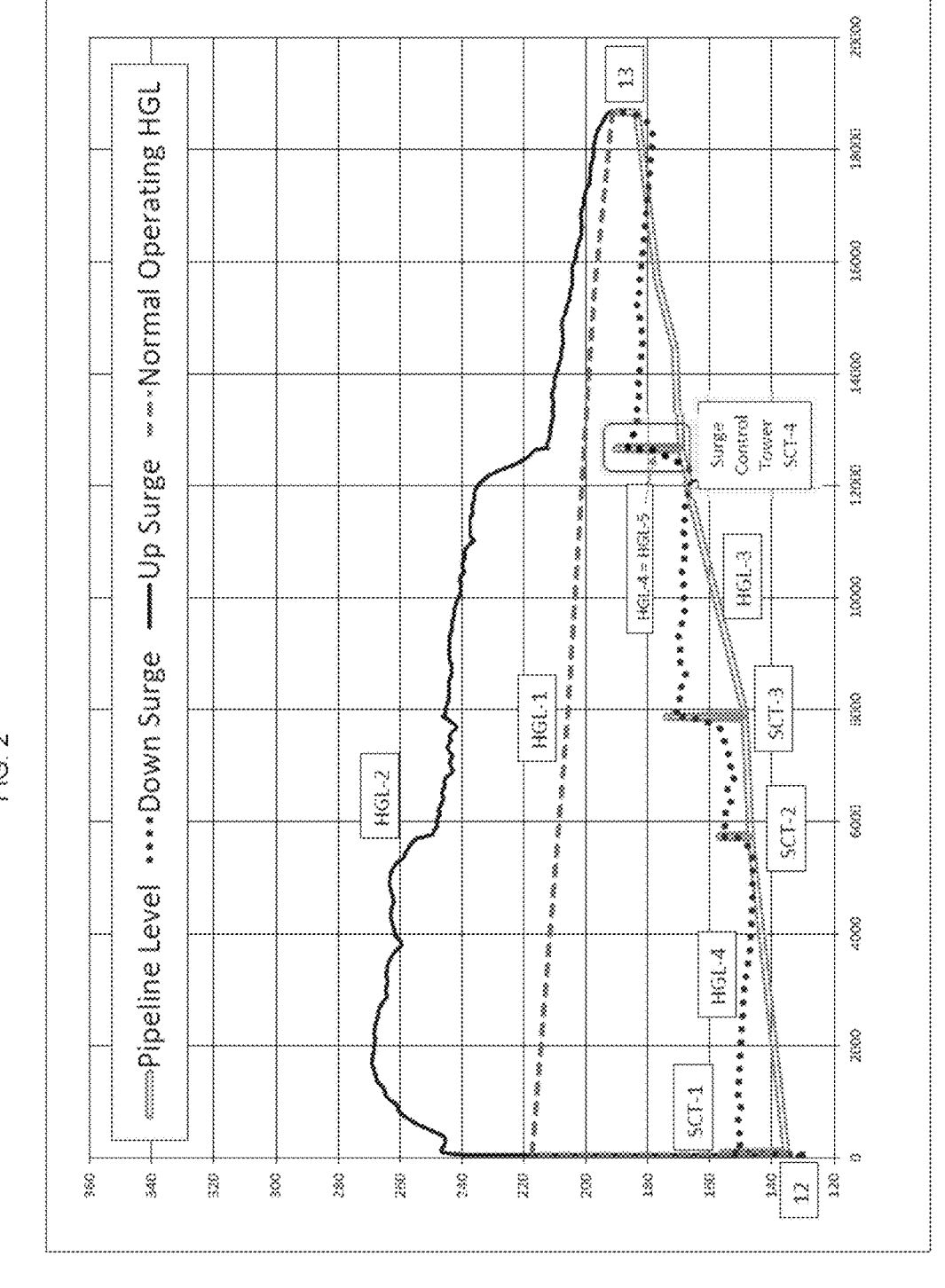
FIG. 2 explains the Surge Water hammer phenomenon graphically after installation of four SCT Surge Control Structures in series.

To understand the Surge Water Hammer Prevention Process, method & invention in totality, please refer to FIG. 2. Typical Surges in Rising Mains with Surge Control Tower (SCT) as Surge Protection Equipment.

The FIG. 1 Pipeline profile is without any Surge Protection Equipment, this in FIG. 2, is now equipped with four Surge Control Towers (SCT-1 to SCT-4).

SCT Structures designed & erected at critical locations as per optimized Surge analysis report, here (12) depicts the source Pumping Plant from where this rising main, depicted as (HGL-3) is pipe's invert level, this rising main terminates into tail-end inlet CWR/OHSR, is depicted by (13) as inlet.

The normal operating Hydraulic Gradient Line (HGL-1) path is depicted as (12, HGL-1, 13), here (12) depicts the source Pumping Plant from where this rising main (depicted as HGL-3 is pipe's invert level), this rising main terminates into tail-end inlet CWR/OHSR, depicted by (13) as inlet. This (HGL-1) continues as long as surge causing events such as sudden power failure, sudden pump stops, closure of valves rapidly etc. do not occur.

The in-line addition of four Surge Control Towers (SCTs) with pipeline alignment is represented as (12, SCT-1, SCT-2, SCT-3, SCT-4,13).

The SCT by virtue of its property to physically hold HGL at any designed elevation, is designed in such a way that firstly Downsurge is physically pulled vertically upward from −10.4 mwc (metre water column) to +10 m to +12 m above ground, hereby converting negative pressures to positive pressures thus preventing formation of sub-atmospheric vacuum collapses.

A series of Surge Control Towers (SCTs) creates artificial stepped ponding by creating controlled differential column separation, utilizing air cushioning effect to dampen the surge waves, controlled column collision etc. effectively taming and dampening the surge water hammer effect. With a perfectly designed SCT, Surge Control is fully achieved, The Upsurge, in FIG. 2, depicted as HGL-2 which is now far better tamed as compared to the same Upsurge (HGL-2) of FIG. 1.

Similarly, the Downsurge has been physically pulled out from −10.4 mwc below the pipeline sub-atmospheric zone to well above the ground thus keeping the minimum HGL above pipe invert level (10), this Downsurge is depicted by (FIG. 2, HGL-4=HGL-5) and (in FIG. 3 as HGL-5). Compare it with the original Downsurge (HGL-4) in FIG. 1 and the Surge Protection results are self-evident.

Both the graphs are the result outputs from Surge Analysis software hydraulic modelling & real-time (microsecond stepping) scenario simulations (SAP2R & Bentley Hammer) thereby providing sufficient proof of SCTs practical industrial usability.

To understand the Surge Control Tower (SCT) structural process, method & typical layout and functionality achieved, please refer to FIGS. 3.1 & 3.2. (Typical Surge Control Tower (SCT) Plan & Elevation respectively.

One typical Surge Control Tower is explained, Water pipeline from upstream side is connected to SCT inflow at (1) and downstream side pipeline is connected to outflow (2), the SCT structure is embedded/supported by thrust blocks (3) of requisite design strengths.

Long bends help in reducing friction losses in pipeline system, water from inflow (1) to Outflow (2) follow a Circular-Vertical loop (4)=(1,16,9,10,11,2), thereby forcefully, raising the HGL to required SCT Design heights (10).

This circular loop (4)=(1,16,9,10,11,2) is connected with help of multiple support (8) spokes/steel guy ropes/fabricates lattice radials etc. to the central hub, and this central hub axle is centrally supported by hinged joint which is connected to steel fabricated pair of triangular/lattice/box/tubular etc. trusses (7) at top and this truss rests and embedded in thrust blocks below ground level.

This SCT arrangement of circular vertical loop (4) with central hinge support is specifically for safely arresting the unbalanced surge forces encountered during separated water columns Downsurges (15) & Upsurges (14), after few moments, the separated water columns again rush towards each other, the collision of two water columns at top (10) causes additional shock waves this is called water hammer effect, Since artificial ridge is created, air valves are to be provided in pipeline at top (10). Thus, to allow sufficient air inflows during the Downsurge column separation, one or multiple Air Valves (several types are Kinetic Air valves/ vacuum breaker/Single acting/double acting/combination etc.) are installed at to (5).

To restrict sudden outflow of air, smaller orifice air outflow air valve (6) is also installed at top.

This is typical layout of a Surge Control Tower (SCT), a series of similar towers at designed chainages, of sufficient height with calculated Air Valve combinations result in a robust Failsafe, Maintenance-free, Energy-free, Fit & Forget Technology, Un-manned Passive Surge Water Hammer Prevention System.

Normal operating HGL is depicted by (HGL-1).

The normal water Flow direction moving forward/upwards is depicted by single headed arrows (9).

The Separated Water Columns, rapidly moving closer & upwards as Surge Pressure wave in pipeline is depicted by triple upward headed arrows (14).

The normal water Flow direction moving forward/downwards is depicted by single headed arrows (11).

The Separated Water Columns, rapidly moving away & downwards as Surge Pressure wave in pipeline is depicted by triple downward headed arrows (15).

The maximum pressures encountered during the entire surge model analysis & simulation, results are plotted as Upsurge waveform and graphically depicted by (HGL-2).

The minimum pressures encountered during the entire surge model simulation are plotted as Downsurge wave and graphically depicted in FIG. 3.2 by (HGL-4) in case of without SCT/(HGL-5) with SCT structure installed.

Pipeline invert level is depicted by (HGL-3), operating pressures above (HGL-3) are Positive, any water level below (HGL-3), is beginning of sub-atmospheric vacuum conditions, thus (HGL-4 without SCT) indicates Minimum pressures to be handled by pipeline, (HGL-2) indicates the Maximum pressures to be handled by the pipeline. The installation of SCT forcefully raises from (HGL-4 without SCT) to (HGL-5 with SCT). When, there surge fluctuations and the operating pressures (HGL-1) starts dropping down the water starts falling down the circular loop top (10) and Valves (5) permit sufficient air inflow to rapidly receding water columns, Water Column Separation (15) occurs when water recedes below pipe bottom of crest (10), thereafter water columns are separates and two parts, Upstream side (1,16,9,10) and Downstream side (10,11,2) travel on opposite directions, this Downsurge (15) wave continues and then the flow reversal of water columns begin and both separated water columns Upstream side (1,16,9,10) and Downstream side (10,11,2) again rush towards top (10) of circular loop, this rapid collision-separation-collision oscillation continues till all the surge pressure wave energy gets dissipated.

To prevent sudden collision of these water columns, air entrapped between (1,16,9,10) & (10,11,2) is prevented from escaping suddenly thereby air cushioning and damping effect controls the upsurge and small orifice air valve (6) permits slow release of air, thereby extending the surge damping effect.

As SCT design creates two different HGLs, Upstream level at (16) and Downstream level at (10) inside the circular vertical loop (4)=(1,16,9,10,11,2) an unequal column separation, vertical differential (16,10) is developed, this simple passive method to force the minimum negative pressure from below the pipe invert level to minimum positive pressure (16,10) which is well above the pipe invert level (HGL-3).

The Downstream (HGL-5) is restricted to minimum level (10), The rising main pipe profile here is rising, and SCT creates an artificial ridge with its trough at (16) and crest at (10), thus the downstream (HGL-5) cannot fall below physical barrier (10) and thus the Downstream HGL is kept well above the pipeline, always keeping pipeline under positive pressure, this takes care of the sub-atmospheric pressures during Downsurges Thus, this invention of Surge Control Tower (SCT), overcomes the limitations of existing Passive Surge Control Devices like One-way Surge tank, Two-way Surge tank, standpipe, Gravity Control Tower etc. which are Surge protection Devices/structures. All these passive surge control devices are to be erected above the maximum upsurge HGL level to avoid overflows during sudden pump failure transients As SCT is a Passive Surge Protection system, it inherently also overcomes the limitations of existing Active Surge Control Devices like Air Vessel, Hydro-phonic Tanks, Bladder Pressure vessels, Special Early anticipatory Surge devices and Valve system, anti-slam surge valves etc., any failure/delayed operation (typically microseconds) of active surge control devices listed above may result in destruction to the pump & pipeline system.

Best Method of Working

The Surge Control Tower (SCT) functioning has already been explained in referred above.

The best method developed for this purpose is developing a Hydraulic simulation model on the commercially available professional Surge Analysis & simulation computer applications "SAP2R" & "Bentley Hammer" software and all possible scenario simulations are carried out to optimize the Surge Control Tower (SCT) Chainage location along Pipeline alignment, its vertical height of crest, valve pressure chamber, type of air valves (single/double/vacuum breaker/ combination/venting etc.)/the inflow and outflow orifice apertures etc. and after developing multiple scenario simulations and model optimization sequences, a failsafe robust SCT based Passive Surge Water Hammer Protection System and accordingly Surge Control Tower (SCT) is finalized.

The selection of suitable location of Surge Control Towers (SCT) to be provided along pipeline alignment are usually chosen from wherever thrust blocks/anchor blocks or Branching are already proposed. This utilizes the thrusts during Surges to be safely arrested and neutralized below ground level. Typical arrangements of one Surge Control Tower (SCT) are depicted in FIG. 3.1 (Plan) & FIG. 3.2 (Elevation).

I claim:

1. A passive surge water hammer protection system consisting of a surge control tower having an inlet (1) connected to a water pipeline from upstream and an outlet (2) connected to a downstream side pipeline;

wherein the surge control tower comprises a vertical circular pipeline (4) whose structure is embedded/ supported by thrust blocks (3);

wherein the flow between the inlet (1) and the outlet (2) of the surge control tower follows a circular-vertical loop, thereby forcefully raising the hydraulic grade line of said flow to the top (10) of the surge control tower;

wherein an artificial ridge is created, air valves (5, 6) are provided near the top (10) of the vertical circular pipeline of the surge control tower to allow air inflow during a down surge column separation, said air valves comprising a pair of valves (5) installed at either side of the top (10) of the vertical circular pipeline to restrict sudden outflow of air, and an additional smaller orifice air outflow air valve (6) installed at the top (10) between the aforementioned pair of valves (5).

2. The passive surge water hammer protection system as claimed in claim 1 wherein the circular vertical pipeline (4) is connected to a central hub by means of multiple support (8) spokes/steel guy ropes/fabricates lattice radials, and this central hub is centrally supported by hinged joint which is connected to the top of a steel fabricated pair of triangular/ lattice/box/tubular trusses (7) and these trusses (7) rests onto the thrust blocks (3) below ground level.

3. The passive surge water hammer protection system as claimed in claim 1 comprising a series of surge control towers creating artificial stepped ponding by creating controlled differential column separation, utilizing air cushioning effect to dampen surge waves, and controlled column collision for effectively taming and dampening the surge water hammer effect.

\*  \*  \*  \*  \*